United States Patent [19]
Yamamori et al.

[11] Patent Number: 6,123,755
[45] Date of Patent: Sep. 26, 2000

[54] ANTIFOULING COATING COMPOSITION

[75] Inventors: Naoki Yamamori, Kyotanabe; Akio Harada, Okayama, both of Japan

[73] Assignee: Nippon Paint Co., Ltd., Osaka, Japan

[21] Appl. No.: 08/990,190

[22] Filed: Dec. 12, 1997

[30] Foreign Application Priority Data

Dec. 12, 1996 [JP] Japan .................................. 8-352667

[51] Int. Cl.$^7$ .............................. C09D 5/16; C08F 30/08; C08L 83/04
[52] U.S. Cl. .................................... 106/15.05; 106/18.36; 526/279; 525/100
[58] Field of Search ........................... 526/279; 525/100; 106/15.05, 18.36

[56] References Cited

U.S. PATENT DOCUMENTS

| | | | |
|---|---|---|---|
| 4,883,852 | 11/1989 | Masuoka et al. | 524/251 |
| 5,973,067 | 10/1999 | Nakamura et al. | 528/15 |

*Primary Examiner*—Robert Dawson
*Assistant Examiner*—Jeffrey B. Robertson
*Attorney, Agent, or Firm*—Pollock, Vande Sande & Amernick

[57] ABSTRACT

An antifouling coating composition which comprises at least two kinds of mutually incompatible resin compositions and which is capable of forming a microheterogenous coating film having a multiplicity of spherical or disk-like minute protrusions comprising at least one of the resin compositions, at least one of the resin compositions to yield the spherical or disk-like minute protrusions being produced from an antifouling monomer and an ethylenically unsaturated monomer copolymerizable therewith.

Since the antifouling coating composition of the present invention contains a resin composition adapted to impart an antifouling effect to the coating film, it displays a long-term antifouling performance beyond the antifouling effect attributable to only said microheterogenous structure.

11 Claims, 1 Drawing Sheet

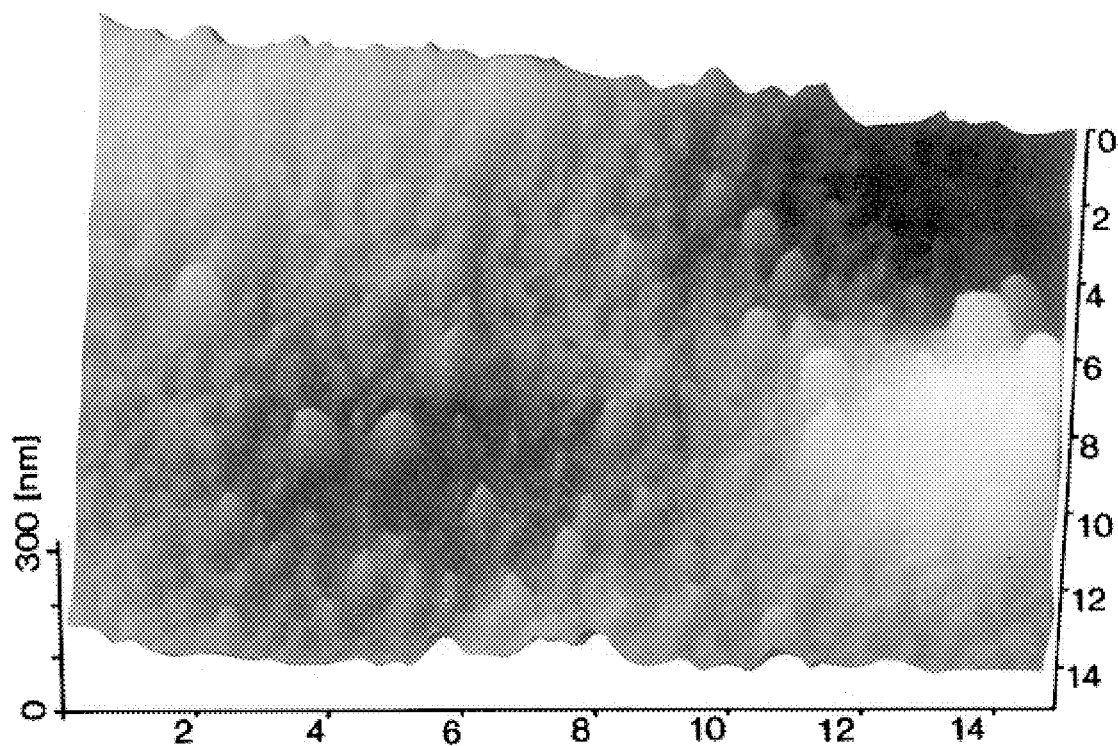

ANTIFOULING COATING COMPOSITION

TECHNICAL FIELD

The present invention relates to an antifouling coating composition.

BACKGROUND OF THE INVENTION

Structures in contact with seawater, for example ships, oceanic constructions, fish farming nets, buoys and industrial water systems are constantly exposed to water inhabited by various organisms. Therefore, as time passes by, microorganisms such as bacteria and diatoms and, further, fouling organisms of larger size, for example such animals and plants as barnacles, mussels and sea lettuce, adhere to said structures. When the surfaces of the structures in contact with seawater are covered with such marine organisms, there take place corrosion of the covered portions, decreased marine fuel efficiency due to increased frictional resistance of the ship bottom against seawater, massive deaths of fish and shellfish due to clogging of fish farming nets, sinking of buoys due to reduced buoyancy.

To prevent these hazardous organisms from adhering, antifouling coatings have so far been applied. Typical of such antifouling coatings are those of the hydrolyzable type which contain a trialkyltin-containing polymer as an essential antifouling component. These antifouling coatings produce their effects when the trialkyltin-containing polymer is hydrolyzed in the weakly alkaline seawater environment, whereby the organotin compound is eluted and at the same time the coating vehicle becomes soluble in water, allowing elution of the antifoulant incorporated. However, the organotin compound eluted is highly toxic and harmful to the ecosystem. Ecofriendly antifouling means have therefore been required from the environmental pollution viewpoint.

Silicone rubber coating films are well known to be capable of producing an antifouling effect without elution of an antifoulant and/or some other component. The silicone rubber coating films have both water-repelling property and elasticity, together with other properties. These properties are utilized to produce the antifouling effect. However, such coating films are attacked by microorganisms in a very early phase following submersion thereof in seawater, with the result that they lose water-repelling property and allow rapid progress of adhesion of marine organisms.

Various proposals have been made to maintain water repellency and attain an improved lasting antifouling effect. Thus, for instance, Japanese Kokai publication She-53-79980 discloses a method which comprises incorporating a silicon- and metal-free organic compound, such as liquid paraffin, into a vulcanized silicone rubber. Japanese Kokoku Publication Sho-56-26272 discloses a method which comprises incorporating a silicone oil with a molecular weight of about 2,000 to 30,000 into a silicone rubber. Japanese Kokoku Publication Sho-60-3433 discloses a method which comprises adding a petroleum fraction-derived substance with a low critical surface tension, such as vaseline, to a silicone rubber. Japanese Kokai Publication Sho-54-26826 and Japanese Kokoku Publication Sho-57-16868 disclose a method which comprises incorporating various thermoplastic resins or a polyvinylbutyral resin into a silicone rubber. However, by these technologies, it is difficult to maintain the antifouling effect over a long period of time.

Japanese Kokai Publication Hei-07-328523 discloses a water-repelling coating film which comprises a resin coating film and minute particles at least the surface of which is hydrophobic and which have a mean size of 1 nm to 1 mm and are fixed on at least 20% of the coating film surface area. However, this technology still has a problem. Since the minute particles are caused to adhere to the resin in the course of coating film formation when the resin is still in the uncured or semicured state, the coating film, when used in water for a long cumulative period, allows the minute particles to come from it, whereby the water repellency of the coating film is impaired.

Therefore, there has been proposed an antifouling technology which comprises coating a substrate surface with a nonelution type coating composition comprising at least two kind of resins mutually incompatible with each other and insoluble in seawater and causing the coating composition to cure in situ to thereby form on the surface a microheterogenous coating film having a plurality of minute protrusions of silicone-grafted acrylic resin. In accordance with this technology, the size and fractional area of said minute protrusions are controlled so as to provide a coating film surface to which marine organisms can hardly attach themselves.

However, even to such a deliberately prepared coating film surface, marine organisms attach themselves after long exposure to seawater. Furthermore, unless the film structure formed is flawless or if it is impaired by chance not to mention an antifouling structure, the antifouling efficiency is lost.

SUMMARY OF THE INVENTION

In view of the above prior art, the present invention has for its object to provide an antifouling coating composition which is ecofriendly and assures a long-lasting antifouling effect.

The present invention is therefore directed to an antifouling coating composition which comprises at least two kinds of mutually incompatible resin compositions and which is capable of forming a microheterogenous coating film having a multiplicity of spherical or disk-like minute protrusions comprising at least one of the resin compositions, at least one of the resin compositions to yield the spherical or disk-like minute protrusions being prepared from an antifouling monomer and an ethylenically unsaturated monomer copolymerizable therewith.

BRIEF DESCRIPTION OF THE DRAWING

The lone FIGURE is an interatomic force photomicrograph showing the coating film surface produced from the antifouling coating composition of Example 1.

DETAILED DESCRIPTION OF THE INVENTION

The present invention is now described in detail.

The antifouling coating composition of the present invention, when applied to a substrate surface, forms a microheterogenous coating film having a multiplicity of spherical or disk-like minute protrusions to thereby exhibit an antifouling action. Additionally, this antifouling action is enhanced by the use of a resin composition prepared from antifouling monomer as the resin compositions to yield said spherical or disk-like minute protrusions.

As used throughout this specification, the term "microheterogenous coating film" means a coating film, when formed from a mixture of two or more resin compositions having contrastive properties, macroscopically showing no separation into the respective resins but microscopically showing microdomains at random formed on the surface by molecules of the same kind gathering together, namely a coating film forming the so-called sea-island structure with the quantitatively dominant component forming a continuous phase and the quantitatively minor component forming a dispersed phase.

The antifouling coating composition of the present invention comprises at least two kinds of mutually incompatible resin compositions. The two or more mutually incompatible resin compositions correspond to the component which, when forming a coating film, yields said spherical or disk-like minute protrusions (hereinafter referred to sometimes as dispersed phase component) and the component which, when forming a coating film, forms a continuous phase other than said spherical or disk-like minute protrusions (hereinafter referred to sometimes as continuous phase component).

At least one kind of the resin compositions to yield said spherical or disk-like minute protrusions is prepared from an ethylenically unsaturated monomer and an antifouling monomer copolymerizable with said ethylenically unsaturated monomer. The terms "antifouling monomer" is used in this specification to mean a monomer which, when contained in a resin composition as a monomeric unit to form a coating film, is capable of imparting antifouling activity to the resulting film. It may be either an elution type one or a nonelution type one.

There is no particular limitation of said antifouling monomer provided that, when contained in a resin composition as a monomeric unit to form a coating film, it imparts antifouling activity to the resulting film. In view of environmental fouling, particularly preferred is an antifouling monomer which is safe for the ecosystem. As preferred examples of such antifouling monomer, there can be mentioned silver (meth)acrylate, copper (meth)acrylate, lead (meth)acrylate, zinc (meth)acrylate, (meth)acrylic monomer having a 6 to 10 carbon atoms-alkyl-substituted phenol moiety as introduced via a chain structure comprising a polyoxyalkylene chain, vinyl monomer having a quaternary ammonium salt structure, vinyl monomer having a quaternary pyridinium salt structure, vinyl monomer having a >C=N-bond as introduced through an amine with 6 to 20 carbon atoms, and vinyl monomer having a >C=N-bond as introduced through an aldehyde with 6 to 20 carbon atoms. These monomers can be used independently or in a combination of two or more species.

The above-mentioned silver (meth)acrylate, copper (meth)acrylate, lead (meth)acrylate and zinc (meth)acrylate exhibit antifouling activity as their salt-forming metal is eluted. Unlike organotin compounds, those compounds are safe with a minimal risk of hazard to the ecosystem.

In the case of a coating composition using said (meth) acrylate monomer having a 6 to 10 carbon atoms-alkyl-substituted phenol moiety as introduced via a chain structure comprising a polyoxyalkylene chain, when forming a coating film, the polymer chain moiety comes into intimate contact with a substrate surface while the alkyl-substituted phenol moiety, which exhibit antifouling effect, is brought into a semi-liberated state in water because of the hydrophilicity of said polyoxyalkylene chain. This state is generally known as pseudo-dissolution. Here, since this antifouling moiety is not eluted into water, the coating composition containing it is ecofriendly and insures a long-term antifouling effect.

The (meth)acrylic monomer having a 6 to 10 carbon atoms-alkyl-substituted phenol moiety as introduced via a chain structure comprising a polyoxyalkylene chain includes but is not limited to N-methyl-N-(2-hydroxy-5-nonylbenzyloxy)pentaoxyethyleneethylmethacylamide, hexaethylene glycol 2-hydroxy-5-nonylbenzyl ether acrylate, hexaethylene glycol 3-nonyl-4-hydroxyphenyl acetate acrylate, hexaethylene glycol 2-hydroxy-5-nonylbenzyl ether (meth)acrylate, hexaethylene glycol 3-nonyl-4-hydroxyphenyl acetate (meth)acrylate, pentaethylene glycol 2-hydroxy-5-nonylanilinoethyl ether (meth) acrylate, pentaethylene glycol 2-hydroxy-4-nonyl ether (meth)acrylate, heptaethylene glycol 2-hydroxy-5-nonylphenyl ether (meth)acrylate, heptaethylene glycol 4-hydroxy-3-nonylphenyl ether (meth)acrylate, heptaethylene glycol 4-hydroxy-2-nonylphenyl ether (meth)acrylate, hexaethylene glycol 4-hydroxy-3-nonylphenyl ether (meth) acrylate, and n-methyl-N-(2-hydroxy-5-nonylbenzyloxy) pentaoxyethyleneethyl-(meth)acrylate.

The above-mentioned vinyl monomer having a quaternary ammonium salt structure and the vinyl monomer having a quaternary pyridinium salt structure are antifouling by themselves. Any resin composition containing either of them also displays antifouling activity.

The vinyl monomer having a quaternary ammonium salt structure includes those compounds which can be prepared by quaternizing a dialkylaminoaklyl (meth)acrylate, a dialkylaminoalkyl (meth)acrylate, or the like with a quaternizing agent in the conventional manner. Thus, dimethylaminopropylmethacrylamidomethyl chloride and dimethylaminoethyl methacrylate chloride, among others, can be mentioned.

The vinyl monomer having a quaternary pyridinium salt structure includes but is not limited to compounds available upon quaternization of vinylpyridine and so forth with a quaternizing agent by the conventional procedure. As a specific example, 1-cetyl-4-vinylpyridinium chloride can be mentioned.

The quaternizing agent that can be used is not particularly limited in kind, thus including but not limited to alkyl halides such as alkyl bromides, alkyl iodides and alkyl chlorides containing not less than 4 carbon atoms, such as n-butyl chloride, hexyl chloride, octyl chloride, dodecyl chloride, tetradecyl chloride, cetyl chloride, etc.; and aralkyl halides such as benzyl chloride, benzyl bromide, and benzyl iodide.

The above-mentioned vinyl monomer having a >C=N-bond as introduced through an amine with 6 to 20 carbon atoms can be provided by reacting an aldehyde group-containing vinyl monomer or a carbonyl group-containing vinyl monomer with an amine with 6 to 20 carbon atoms. The aldehyde group-containing vinyl monomer is not critical in kind but includes such monomers as acrolein, methacrolein, crotonaldehyde, cinnamaldehyde, and 4-vinylbenzaldehyde, among others. The carbonyl group-containing vinyl monomer is not critical in kind, either, and may for example be diacetonacrylamide.

There is no particular limitation on said amine with 6 to 20 carbon atoms but includes aromatic primary amines such as aniline, toluidine, xylidine, p-n-hexylaniline, p-n-octylaniline, p-nonylaniline, p-dodecylaniline, etc.; alicyclic amines such as cyclohexylamine etc.; and aliphatic amines such as hexylamine, octylamine, decylamine, laurylamine, oleylamine, stearylamine, etc.

The above-mentioned vinyl monomer having a >C=N-bond as introduced through an aldehyde with 6 to 20 carbon atoms is obtained by reacting a primary amino group-containing vinyl monomer with an aldehyde with 6 to 20 carbon atoms. The primary amino group-containing vinyl monomer is not critical in kind but includes 4-vinylaniline, 2-aminoethyl (meth)acrylate, and allylamine, among other vinyl monomers.

There is no particular limitation on the aldehyde with 6 to 20 carbon atoms, either. Thus, it includes saturated or unsaturated aldehydes such as caproaldehyde, caprylaldehyde, capraldehyde, lauraldehyde, stearaldehyde, etc.; aromatic aldehydes such as cinnamaldehyde etc.; benzaldehyde and nuclearly substituted benzaldehyde derivatives such as p-n-hexylbenzaldehyde, p-oleylbenzaldehyde, vaniline, etc.

When the coating film, which is formed from a coating composition containing said vinyl monomer having a >C=N-bond as introduced through the amine with 6 to 20 carbon atoms or said vinyl monomer having a >C=N-bond as introduced through the aldehyde with 6 to 20 carbon atoms, is exposed to seawater or the like, the >C=N-bond is hydrolyzed so that the amine with 6 to 20 carbon atoms or the aldehyde with 6 to 20 carbon atoms is released from the coating film. They have antifouling activity, and are released in water only gradually over a long period of time without a burst of release at any one time. Thus, since those antifouling compounds are released in small appropriate portions over a long time, it is possible to insure a long-term antifouling effect even by way of nothing but the very coating composition prepared from said vinyl monomer having a >C=N-bond as introduced through an amine with 6 to 20 carbon atoms or said vinyl monomer having a >C=N-bond as introduced through an aldehyde with 6 to 20 carbon atoms.

There is no particular limitation on the above-mentioned ethylenically unsaturated monomer copolymerizable with said antifouling monomer. Thus, there can be mentioned for example, the common monomers such as ethylene, vinyl chloride, (meth)acrylic acid, (meth)acrylic esters, styrene, vinyl acetate, etc.; and polymerizable silicone macromonomers having a polymerizable unsaturated bonds at its termini. Particularly preferred is an ethylenic unsaturation-containing silicone macromonomer.

The resin composition in the present invention can be produced typically by the following technology from said antifouling monomer and said ethylenically unsaturated monomer copolymerizable with the antifouling monomer.

Thus, said antifouling monomer and ethylenically unsaturated monomer are added to a solvent and the mixture is heated for polymerization with stirring in the presence of a polymerization initiator.

When the vinyl monomer having a >C=N-bond as introduced through the amine with 6 to 20 carbon atoms is used as said antifouling monomer, the process for producing the objective resin composition may comprise reacting said aldehyde group-containing vinyl monomer or carbonyl group-containing vinyl monomer with the amine with 6 to 20 carbon atoms in the first place for introduction of the amine and then polymerizing the reaction product with said ethylenically unsaturated monomer or, alternatively, polymerizing said aldehyde group-containing vinyl monomer or carbonyl group-containing vinyl monomer in the first place, then reacting the resulting polymer with the amine with 6 to 20 carbon atoms for introduction of the amine, and finally polymerizing the reaction product with said ethylenically unsaturated monomer. A further alternative process comprises polymerizing said aldehyde group-containing vinyl monomer or carbonyl group-containing vinyl monomer with said ethylenically unsaturated monomer and then reacting the reaction product with said amine with 6 to 20 carbon atoms.

When the vinyl monomer having a >C=N-bond as introduced through an aldehyde with 6 to 20 carbon atoms is used as said antifouling monomer, the process for producing the objective resin composition comprises reacting said primary amino group-containing vinyl monomer with said aldehyde with 6 to 20 carbon atoms for introduction of the aldehyde in the first place and then polymerizing the reaction product with said ethylenically unsaturated monomer, or alternatively, polymerizing said primary amino group-containing vinyl monomer in the first place, then reacting the resulting polymer with said aldehyde with 6 to 20 carbon atoms for introduction of the aldehyde, and finally polymerizing the reaction product with said ethylenically unsaturated monomer. A further alternative process comprises polymerizing said primary amino group-containing vinyl monomer with said ethylenically unsaturated monomer in the first place and then reacting the resulting polymer with said aldehyde with 6 to 20 carbon atoms.

The resin composition prepared from said ethylenically unsaturated monomer and said antifouling monomer copolymerizable therewith forms a coating film having an antifouling performance. The mode of antifouling attributable to said antifouling monomer may be either an elution type such that the antifoulant moiety is eluted, or a pseudo-dissolution type such that the antifoulant moiety itself is not eluted. In the present invention, the nonelution type is preferred in order that the resulting film may retain the antifouling action for a long time.

The resin composition to yield said spherical or disk-like minute protrusions in accordance with the present invention may optionally contain, in addition to the above composition providing for an antifouling effect, one or more other resins in proportions not interfering with the construction of the invention. As such resins, there can be mentioned acrylic resin, styrenic resin, epoxy resin, polyester resin, amino resin, vinyl acetate-ethylene copolymer resin, fluoro resin, urethane resin, and so on.

There is no particular limitation on the resin composition to form a continuous phase other than said spherical or disk-like minute protrusions. Preferred, however, is a reaction-setting silicone rubber such as a one-pack setting silicone rubber composition. When a water-insoluble resin composition is used as said resin composition other than the resin composition to yield said spherical or disk-like minute protrusions, the microheterogenous structure of the film surface can be retained for a long period of time.

In the present invention, the resin composition to yield said spherical or disk-like minute protrusions, i.e. the dispersed phase component, and the resin composition to form a continuous phase other than said spherical or disk-like minute protrusions, i.e. the continuous phase component, are mutually incompatible, with their difference in solubility parameter (SP) being preferably 0.3 to 4 $[cal/cm^3]^{1/2}$.

If the SP differential is smaller than 0.3 $[cal/cm^3]^{1/2}$, the resin composition to yield said spherical or disk-like minute protrusions and the resin composition to form a continuous phase other than said spherical or disk-like minute protrusions dissolve in each other so that the coating film fails to attain a microscopically heterogeneous structure with the consequent decrease in antifouling performance. On the other hand, if the SP differential is greater than 4 $[cal/cm^3]^{1/2}$, the two resins substantially fail to undergo interaction and are completely separated in phase. The phase separation means that the resin compositions having contrastive properties undergo cohesion independently of each other as if the compositions were respectively formed into the coating film.

In this state, the film strength is low at every junction between the respective resins so that the coating film cannot retain its shape and strength.

In the present invention, the formulating amount A of the resin composition to yield said spherical or disk-like minute protrusions, i.e. the dispersed phase component, and the formulating amount B of the resin composition to form a continuous phase other than said spherical or disk-like minute protrusions, i.e. the continuous phase component, are preferably in a weight ratio of A/B=0.3/99.7 to 45/55. If the ratio is less than 0.3, the antifouling action of the resulting film will be insufficient. If the ratio exceeds 45, the antifouling effect will be satisfactory but the phase separation will be too great to insure a microheterogenous structure and an apparently uniform surface color tone.

Where necessary, the antifouling coating composition of the present invention may be supplemented with a known antifouling agent, bactericide, an anti-algae agent, and/or a water repellent such as silicone oil, paraffin, vaseline, etc.

The antifouling coating composition of the present invention can be manufactured typically by the following production technology.

The antifouling coating composition of the invention can be provided by formulating said resin composition to yield said spherical or disk-like minute protrusions, said resin composition to form a continuous phase other than said spherical or disk-like minute protrusions, a solvent, and, where necessary, said additives and processing the mixture into a coating composition with a known dispersing machine such as a homodisper.

There is no particular limitation on the solvent used for the manufacture of the antifouling coating composition of the invention. For example, such organic solvents as xylene, toluene, etc. can be employed.

The antifouling coating composition of the present invention can be coated on a substrate, dried in situ, and optionally cured to give a microheterogenous coating film having a multiplicity of spherical or disk-like minute protrusions on the substrate surface. The preferred thickness of the coating film is 10 to 400 $\mu$m.

The preferred size of the spherical or disk-like minute protrusions yielded on the substrate surface is 10 m, to 20 $\mu$m in mean size. Within this mean size range, the very microheterogenous surface structure of the coating film provides a sufficient antifouling effect which, coupled with the antifouling effect attributable to the antifouling component contained, insures an excellent overall antifouling performance.

The preferred substrate is a structure to be installed in water. There is no particular limitation on the type of such structure. Thus, ship bottoms, fish farming nets, stationary nets, buoys, etc. as well as cooling water systems for factories and power stations can be mentioned by way of example.

The antifouling coating composition of the present invention comprises at least two mutually incompatible resin compositions and forms a microheterogenous coating film exhibiting an antifouling effect. This is because the microheterogenous coating film in accordance with the invention provides a surface to which marine organisms can hardly attach themselves.

Since the antifouling coating composition of the present invention contains a resin composition adapted to impart an antifouling effect to the coating film as at least one of the resin compositions to yield said spherical or disk-like minute protrusions, it displays an antifouling performance beyond the antifouling effect attributable to said microheterogenous structure. Moreover, those two effects join forces in a synergistic or complementary fashion to insure a long-term antifouling performance of the coating film.

Having the construction described above, the antifouling coating composition of the invention exhibits a long-lasting antifouling performance and can be used with great advantage for structures to be installed in water.

BEST MODE FOR CARRYING OUT THE INVENTION

The following examples are intended to illustrate the present invention in further detail but are by no means limitative of the scope of the invention.

PRODUCTION EXAMPLE 1

A four-necked flask equipped with a stirrer and a nitrogen gas inlet line was charged with 70 g of xylene and 20 g of n-butanol and heated at 90° C. Thereto was added a solution consisting of 20 g of methacrylic acid, 35 g of n-butyl acrylate, 45 g of methyl methacrylate, and 1.2 g of t-butylperoxy-2-ethyl hexanoate dropwise over 3 hours. The mixture was incubated for 30 minutes, after which 10 g of xylene and 0.3 g of t-butylperoxy-2-ethyl hexanoate were added. The mixture was further incubated for 2 hours. To this solution was added 38 g of silver acetate and the mixture was refluxed, with the acetic acid and solvent being removed by decantation. The same quantity of xylene as the removed solvent was replenished to provide varnish 1. The SP value of the varnish was 12.8 $[\text{cal/cm}^3]^{1/2}$.

PRODUCTION EXAMPLE 2

A four-necked flask equipped with a stirrer and a nitrogen gas inlet line was charged with 70 g of xylene and 20 g of n-butanol and heated at 90° C. Thereto was added a solution consisting of 5 g of methacrylic acid, 15 g of n-butyl acrylate, 55 g of methyl methacrylate, 25 g of methacrylopropyltricosamethylundecasiloxane, and 1.2 g of t-butylperoxy-2-ethyl hexanoate dropwise over 3 hours. The mixture was incubated for 30 minutes, after which 10 g of xylene and 0.3 g of t-butylperoxy-2-ethyl hexanoate were added. The mixture was then incubated for 2 hours. To this solution was added 10 g of copper acetate and the mixture was refluxed with the acetic acid and solvent being removed by decantation. The same quantity of xylene as the removed solvent was replenished to provide varnish 2. Its SP value was 10.6 $[\text{cal/cm}^3]^{1/2}$.

PRODUCTION EXAMPLE 3

A four-necked flask equipped with a stirrer and a nitrogen gas inlet line was charged with 90 g of xylene and heated at 100° C. Thereto was added a solution consisting of 45 g of 4-octylbenzylidene-4'-vinylaniline, 15 g of n-butyl acrylate, 40 g of methyl methacrylate, and 1.3 g of t-butylperoxy-2-ethyl hexanoate dropwise over 3 hours. The mixture was incubated for 30 minutes, after which 10 g of xylene and 0.3 g of t-butylperoxy-2-ethyl hexanoate were further added. The mixture was then incubated for 2 hours to provide varnish 3. Its SP value was 9.3 $[\text{cal/cm}^3]^{1/2}$.

PRODUCTION EXAMPLE 4

A four-necked flask equipped with a stirrer and a nitrogen gas inlet line was charged with 90 g of xylene and heated at 100° C. Thereto was added a solution consisting of 55 g of 4-vinylbenzylideneoctylaniline, 30 g of methacrylopropyltricosamethylundecasiloxane, 15 g of methyl methacrylate, and 1.3 g of azobisisobutyronitrile dropwise over 3 hours. This mixture was incubated for 30 minutes, after which 10 g of xylene and 0.3 g of t-butylperoxy-2-ethyl hexanoate were further added. The mixture was then incubated for 2 hours to provide varnish 4. Its SP value was 9.1 $[cal/cm^3]^{1/2}$.

PRODUCTION EXAMPLE 5

A four-necked flask equipped with a stirrer and a nitrogen gas inlet line was charged with 90 g of xylene and heated at 100° C. Thereto was added a solution consisting of 60 g of N-methyl-N-(2-hydroxy-5-nonylbenzyloxy)-pentoxyethyleneethylmethacrylamide, 40 g of methyl methacrylate, and 1.3 g of azobisisobutyronitrile dropwise over 3 hours. The mixture was incubated for 30 minutes, after which 10 g of xylene and 0.3 g of t-butylperoxy-2-ethyl hexanoate were further added. This mixture was incubated for 2 hours to provide varnish 5. Its SP value was 10.9 $[cal/cm^3]^{1/2}$.

PRODUCTION EXAMPLE 6

A four-necked flask equipped with a stirrer and a nitrogen gas inlet line was charged with 90 g of xylene and heated at 100° C. Thereto was added a solution consisting of 40 g of N-methyl-N-(2-hydroxy-5-nonylbenzyloxy)-pentoxyethylene-ethylmethacrylamide, 30 g methacrylopropylpentadecamethylheptasiloxane, 30 g of methyl methacrylate, and 1.3 g of azobisisobutyronitrile dropwise over 3 hours. The mixture was incubated for 30 minutes, after which 10 g of xylene and 0.3 g of t-butylperoxy-2-ethyl hexanoate were further added. This mixture was incubated for 2 hours to provide varnish 6. Its SP value was 10.6 $[cal/cm^3]^{1/2}$.

PRODUCTION EXAMPLE 7

A four-necked flask equipped with a stirrer and a nitrogen gas inlet line was charged with 90 g of xylene and heated at 100° C. Thereto was added a solution consisting of 10 g of 1-cetyl-4-vinylpyridinium chloride, 30 g of n-butyl methacrylate, 60 g of methyl methacrylate, and 1.3 g of azobisisobutyronitrile dropwise over 3 hours. The mixture was incubated for 30 minutes, after which 10 g of xylene and 0.3 g of t-butylperoxy-2-ethyl hexanoate were further added. This mixture was incubated for 2 hours to provide varnish 7. Its SP value was 11.2 $[cal/cm^3]^{1/2}$.

PRODUCTION EXAMPLE 8

A four-necked flask equipped with a stirrer and a nitrogen gas inlet line was charged with 90 g of xylene and heated at 100° C. Thereto was added a solution consisting of 15 g of dimethylaminopropylmethacrylamidomethyl chloride, 30 g of methacrylopropyltricosamethylundecasiloxane, 20 g of 2-ethylhexyl methacrylate, 35 g of methyl methacrylate, and 1.3 g of azobisisobutyronitrile dropwise over 3 hours. The mixture was incubated for 30 minutes, after which 10 g of xylene and 0.3 g of t-butylperoxy-2-ethyl hexanoate were further added. The mixture was then incubated for 2 hours to provide varnish 8. Its SP value was 10.9 $[cal/cm^3]^{1/2}$.

COMPARATIVE PRODUCTION EXAMPLE 1

A four-necked flask equipped with a stirrer and a nitrogen gas inlet line was charged with 90 g of xylene and heated at 100° C. Thereto was added a solution consisting of 40 g of methacrylopropyltricosamethylundecasiloxane, 10 g of 2-ethylhexyl methacrylate, 50 g of methyl methacrylate, and 1.3 g of azobisisobutyronitrile dropwise over 3 hours. The mixture was incubated for 30 minutes, after which 10 g of xylene and 0.3 of t-butylperoxy-2-ethyl hexanoate were further added. This mixture was incubated for 2 hours to provide comparative varnish 1. Its SP value was 10.4 $[cal/cm^3]^{1/2}$.

EXAMPLES 1 through 14, COMPARATIVE EXAMPLES 1 through 4

Preparation of Test Films

Using a high-speed homodisper, coating compositions were prepared according to the recipes shown in Table 1 and each coating composition was coated on a 100×100 mm poly(vinyl chloride) sheet in a dry thickness of about 100 μm. The coated sheet was allowed to stand under interior conditions for a week and submitted to an antifouling test.

Antifouling Test

The coated sheets corresponding to Examples 1 to 14 and Comparative Examples 1 to 4 were respectively installed in a seawater channel with a mean flow rate of about 2 m/sec. for 2 months and then set under water on a raft owned by Nippon Paint Coastal Laboratory at Tamano, Okayama Prefecture and the percent (%) area of biotic attachment was visually rated. The results are shown in Table 2.

TABLE 1

| | Example | | | | | | | | | | | | | | Comparative Example | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 |
| Varnish 1 | 10 | 20 | — | — | — | — | — | — | — | — | — | — | — | — | — | 0.2 | — | — |
| Varnish 2 | — | — | 20 | — | — | — | — | — | — | — | — | — | — | — | — | — | — | — |
| Varnish 3 | — | — | — | 30 | — | — | — | — | — | — | — | — | 5 | — | — | — | — | — |
| Varnish 4 | — | — | — | — | 5 | — | — | — | — | — | — | 15 | — | — | — | — | — | — |
| Varnish 5 | — | — | — | — | — | 15 | — | — | — | — | 10 | — | — | — | — | — | — | — |
| Varnish 6 | — | — | — | — | — | — | 15 | — | — | 15 | — | — | — | — | — | — | — | — |
| Varnish 7 | — | — | — | — | — | — | — | 1o | — | 15 | — | — | — | — | — | — | — | — |
| Varnish 8 | — | — | — | — | — | — | — | — | 1o | — | — | — | — | — | — | — | — | — |
| Comparative varnish 1 | — | — | — | — | — | — | — | — | — | — | — | — | — | — | — | — | 10 | 20 |
| Silicone resin* | 45 | 40 | 45 | 35 | 45 | 40 | 45 | 50 | 50 | 45 | 40 | 45 | 45 | 55 | 50 | 49 | 45 | 45 |
| Liquid paraffin | — | — | — | — | — | — | — | — | — | 10 | 10 | 5 | — | — | — | 0.8 | — | — |
| White petrolatum | — | — | — | — | — | — | — | — | — | — | 5 | 5 | — | — | — | — | — | — |
| Xylene | 10 | 40 | 35 | 35 | 40 | 45 | 40 | 40 | 40 | 30 | 30 | 35 | 40 | 40 | 50 | 50 | 45 | 35 |

TABLE 1-continued

|  | Example | | | | | | | | | | | | | | Comparative Example | | | |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 | 4 |
| Toluene | 35 | — | — | — | 10 | — | — | — | — | — | — | — | — | — | — | — | — | — |
| Total | 100 | 100 | 100 | 100 | 100 | 100 | 100 | 100 | 100 | 100 | 100 | 100 | 100 | 100 | 100 | 100 | 100 | 100 |

In Table 1, silicone resin* is a moisture-setting silicone resin (KE45TS, Shin-Etsu Chemical Co. Ltd.; SP value: 9.2 $[cal/cm^3]^{1/2}$).

TABLE 2

|  | 6 months | 9 months | 12 months | 24 months |
|---|---|---|---|---|
| Example 1 | 0 | 0 | 0 | 5 |
| Example 2 | 0 | 0 | 0 | 10 |
| Example 3 | 0 | 0 | 0 | 0 |
| Example 4 | 0 | 0 | 0 | 10 |
| Example 5 | 0 | 0 | 0 | 0 |
| Example 6 | 0 | 0 | 0 | 10 |
| Example 7 | 0 | 0 | 0 | 0 |
| Example 8 | 0 | 0 | 0 | 5 |
| Example 9 | 0 | 0 | 0 | 0 |
| Example 10 | 0 | 0 | 0 | 5 |
| Example 11 | 0 | 0 | 0 | 0 |
| Example 12 | 0 | 0 | 0 | 5 |
| Example 13 | 0 | 0 | 0 | 0 |
| Example 14 | 0 | 0 | 0 | 5 |
| Comparative Example 1 | 20 | 30 | 100 | 100 |
| Comparative Example 2 | 10 | 20 | 50 | 100 |
| Comparative Example 3 | 0 | 0 | 10 | 30 |
| Comparative Example 4 | 0 | 0 | 15 | 40 |

According to Examples 1 to 14 in which the coating compositions comprised an antifouling resin and a silicone resin incompatible with the antifoulant resin and the resulting coating films were microheterogenous in structure, no marine organisms, therefore, attached themselves to the film surface for as many as 12 to 24 months after submersion in marine water. In Comparative Examples 1 and 2, in which the antifouling resin was either not contained or contained only at an insufficient level or the microheterogenous film structure was not formed, the attachment of marine organisms was found as early as about 6 months following seawater immersion. In Comparative Examples 3 and 4 in which no antifoulant resin was contained in the film but the microheterogenous structure had been formed, no attachment of marine organisms was found up to 9 months of seawater immersion but some attachment occurred after 12 months, indicating that no long-term antifouling effect can be expected.

What is claimed is:

1. An antifouling coating composition which comprises at least two kinds of mutually incompatible resin compositions and which is capable of forming a microheterogenous coating film having a multiplicity of spherical or disk minute protrusions having a mean size of 10 nm to 20 μm comprising at least one of the resin compositions, wherein at least one of the resin composition to yield the spherical or disk minute protrusions is prepared from copolymerizing an antifouling monomer and an ethylenically unsaturated monomer copolymerizable with the antifouling monomer.

2. The antifouling coating composition according to claim 1, whrein the ethylenically unsaturated monomer is an ethylenic unsaturation-containing silicone macromonomer.

3. The antifouling coating composition according to claim 1, wherein, of said at least two kinds of mutually incompatible resin compositions, the resin composition to form a continuous phase other than said spherical or disk minute protrusions is a condensation reaction curable silicone rubber.

4. The antifouling coating composition according to claim 1, wherein said at least two kinds of mutually incompatible resin compositions comprise the resin composition to yield the spherical or disk minute protrusions and the resin composition to form a continuous phase other than said spherical or disk minute protrusions, the weight ratio of the formulating amount A of said resin composition to yield the spherical or disk minute protrusions to the formulating amount B of said resin composition to form a continuous phase other than said spherical or disk minute protrusions being A/B=0.3/99.7 to 45/55.

5. The antifouling coating composition according to claim 2, wherein the antifouling monomer is at least one member selected from the group of silver (meth)acrylate, copper (meth)acrylate, lead (meth)acrylate, zinc (meth)acrylate, (meth)acrylic monomer having a 6 to 10 carbon atoms-alkyl-substituted phenyl moiety combined by an intervening chain structure comprising a polyoxyalkylene chain, vinyl monomer having a quaternary ammonium salt structure, vinyl monomer having a quaternary pyridinium salt structure, vinyl monomer having an amine with 6 to 20 carbon atoms, combined by an intervening >C═N-bond and vinyl monomer having an aldehyde with 6 to 20 carbon atoms combined by an intervening >C═N-bond.

6. The antifouling coating composition according to claim 2, wherein, of said at least two kinds of mutually incompatible resin compositions, the resin composition to form a continuous phase other than said spherical or disk minute protrusions is a reaction-curable silicone rubber.

7. The antifouling coating composition according to claim 2, wherein said at least two kinds of mutually incompatible resin compositions comprise the resin composition to yield the spherical or disk minute protrusions and the resin composition to form a continuous phase other than said spherical or disk minute protrusions, the weight ratio of the formulating amount A of said resin composition to yield the spherical or disk minute protrusions to the formulating amount B of said resin composition to form a continuous phase other than said spherical or disk minute protrusions being A/B=0.3/99.7 to 45/55.

8. The antifouling coating composition according to claim 3, wherein said at least two kinds of mutually incompatible resin compositions comprise the resin composition to yield the spherical or disk minute protrusions and the resin composition to form a continuous phase other than said spherical or disk minute protrusions, the weight ratio of the formulating amount A of said resin composition to yield the spherical or disk minute protrusions to the formulating amount B of said resin composition to form a continuous phase other than said spherical or disk minute protrusions being A/B=0.3/99.7 to 45/55.

9. The antifouling coating composition according to claim 1, wherein the antifouling monomer is at least one member selected from the group consisting of silver (meth)acrylate, copper (meth)acrylate, lead (meth)acrylate, zinc (meth)acrylate, (meth)acrylic monomer having 6 to 10 carbon atoms-alkyl-substituted phenyl moiety combined by an intervening chain structure comprising a polyoxyalkylene chain, vinyl monomer having a quaternary ammonium salt structure, vinyl monomer having a quaternary pyridinium salt structure, vinyl monomer having an amine with 6 to 20 carbon atoms combined by an intervening >C=N-bond, and vinyl monomer having an aldehyde with 6 to 20 carbon atoms combined by an intervening >C=N-bond.

10. The antifouling coating composition according to claim 9, wherein, of said at least two kinds of mutually incompatible resin compositions, the resin composition to form a continuous phase other than said spherical or disk minute protrusions is a reaction-curable silicone rubber.

11. The antifouling coating composition according to claim 9, wherein said at least two kinds of mutually incompatible resin compositions comprise the resin composition to yield the spherical or disk minute protrusions and the resin composition to form a continuous phase other than said spherical or disk minute protrusions, the weight ratio of the formulating amount A of said resin composition to yield the spherical or disk minute protrusions to the formulating amount B of said resin composition to form a continuous phase other than said spherical or disk minute protrusions being A/B=0.3/99.7 to 45/55.

* * * * *